July 25, 1961 K. H. BARNES ET AL 2,993,309
MACHINE FOR THE SURFACE TREATMENT OF THIN PLASTIC FILMS
Filed April 26, 1956 3 Sheets-Sheet 1
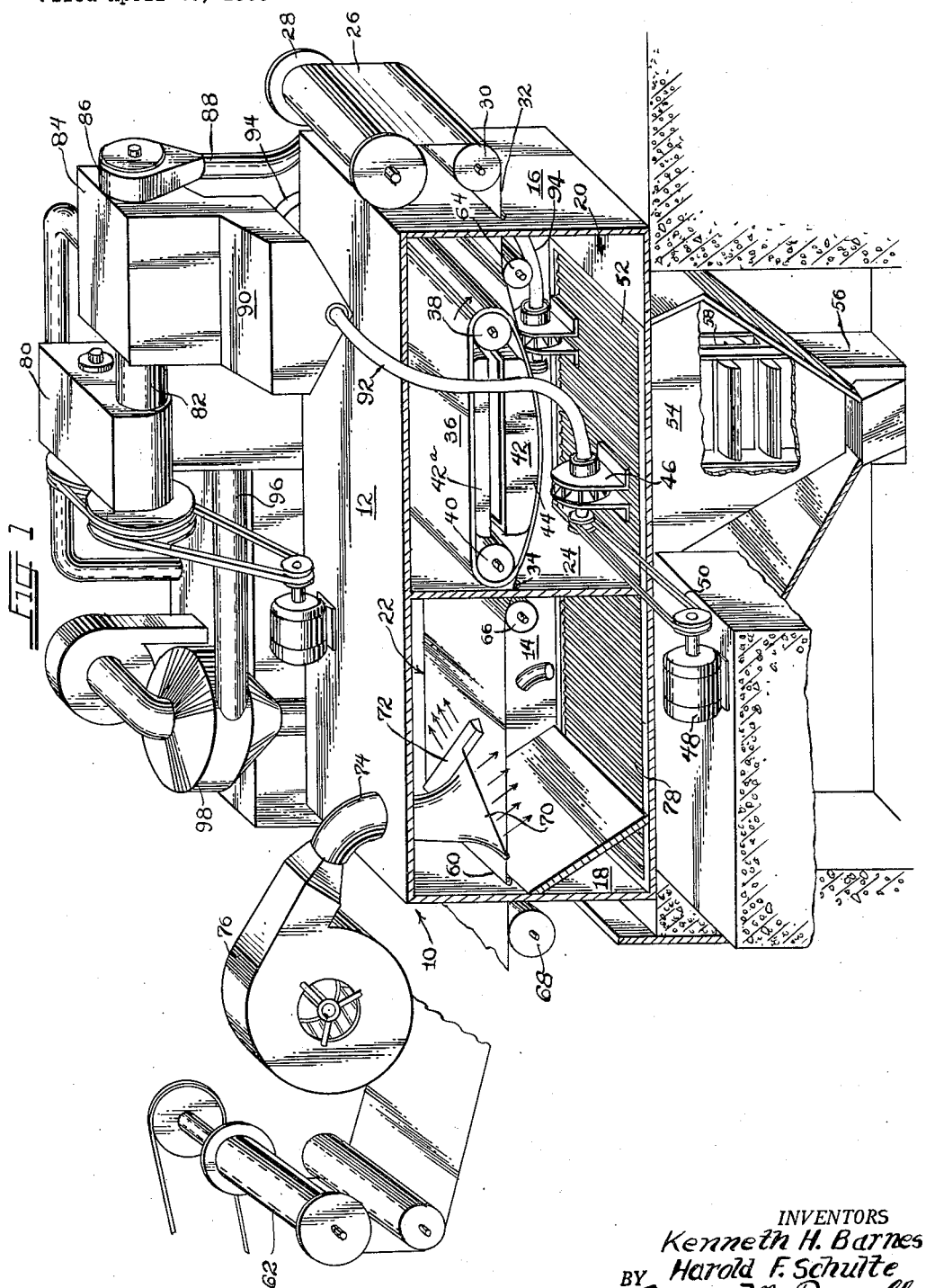
INVENTORS
Kenneth H. Barnes
Harold F. Schulte
BY Ooms, McDougall
Williams and Hersh
Attorneys

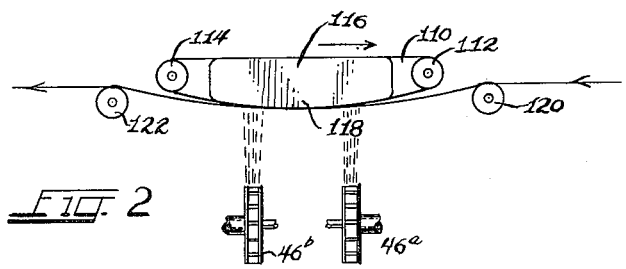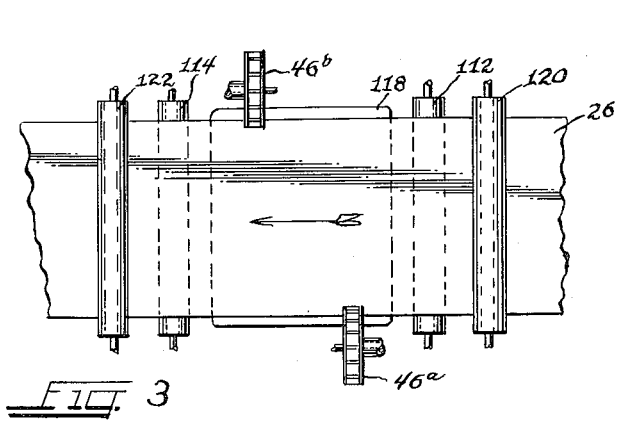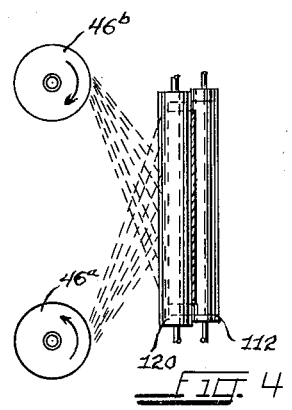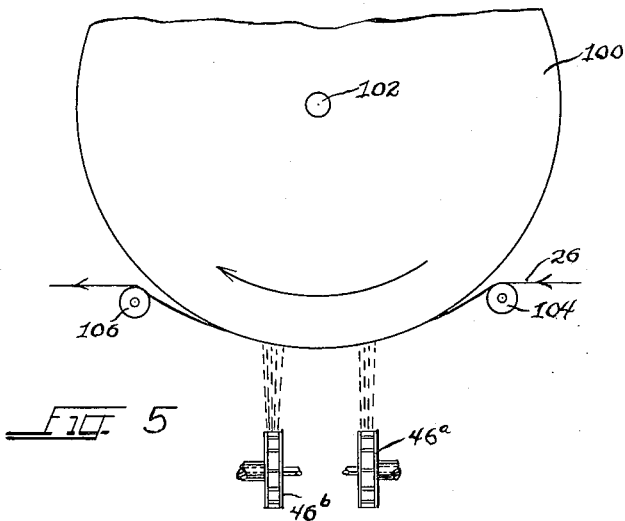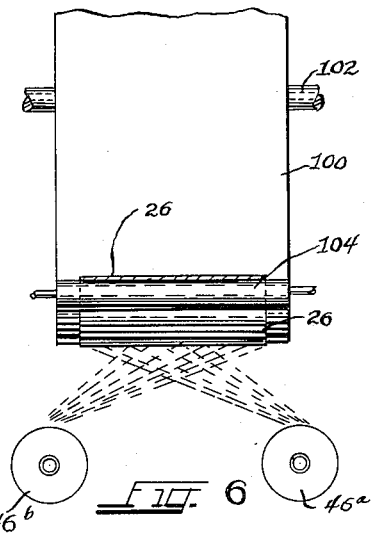

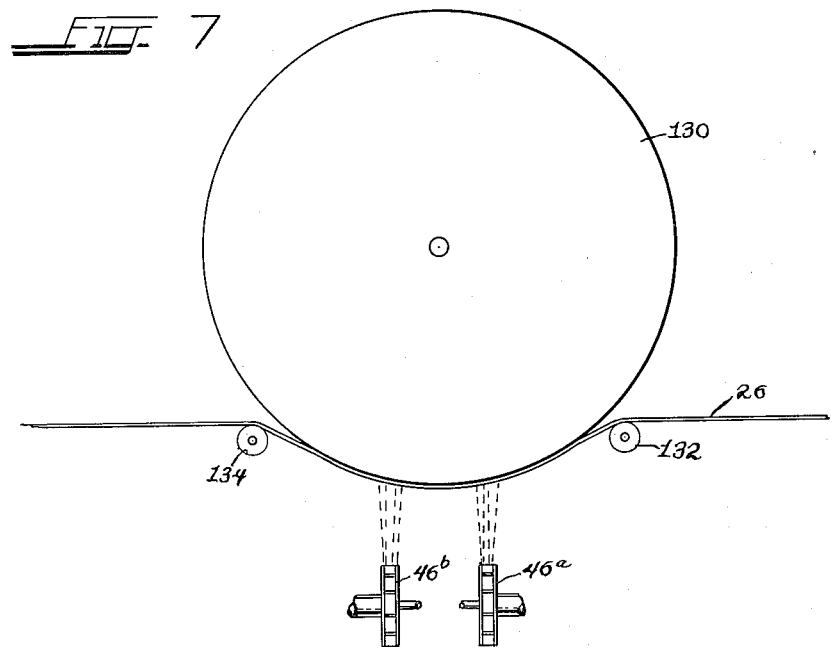
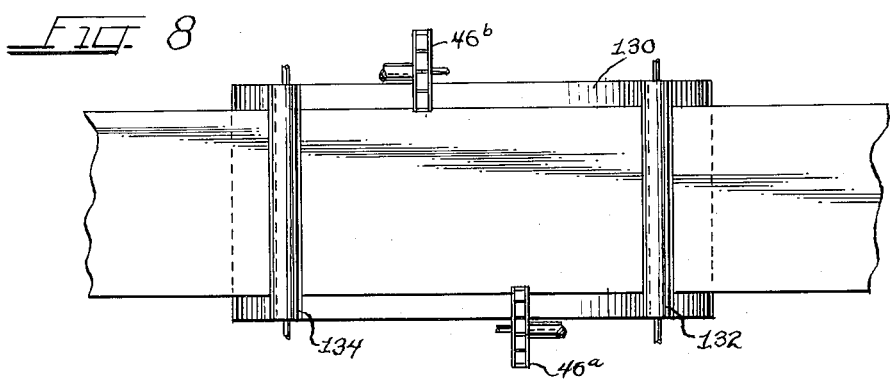
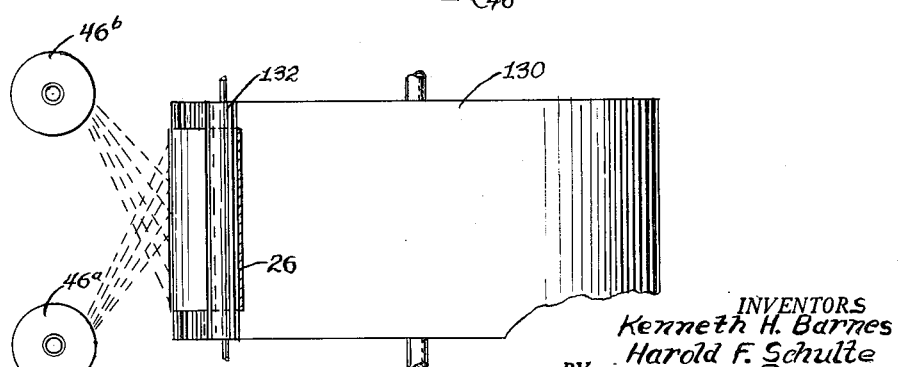

United States Patent Office 2,993,309
Patented July 25, 1961

2,993,309
MACHINE FOR THE SURFACE TREATMENT OF THIN PLASTIC FILMS
Kenneth H. Barnes, South Bend, and Harold F. Schulte, Mishawaka, Ind., assignors, by mesne assignments, to Bell Intercontinental Corporation, South Bend, Ind., a corporation of Delaware
Filed Apr. 26, 1956, Ser. No. 580,800
9 Claims. (Cl. 51—14)

This invention relates to the treatment of films of synthetic resinous material to produce a dull or matte finish on the surfaces thereof and it relates more particularly to the treatment of extremely thin films of plastic or synthetic resinous material by a centrifugal blasting process to introduce roughness in the surface of the film without causing deterioration or destruction of the film of synthetic resinous or plastic materials.

A film of synthetic resinous material or plastic having surface roughness sufficient to provide a matte finish has been found to be desirable for a number of reasons important to the use of the resinous film in various applications. In the use of the film as an element in combinations with adhesives for bonding the resinous film to various surfaces, the matte finish improves the anchoring relationship between the resinous material and the film whereby a stronger bonding relation can be established to minimize the possibilities of delamination or separation. The matte finish on the surface of the film permits a better anchoring relationship to be established with materials applied thereon as a coating, finish or printing or the like, as in the use of the film as a base for photosensitive materials or as a printing or writing base in many applications. The gloss which characterizes the surface naturally formed on the film of the plastic or synthetic resinous material has been found to be objectionable from the standpoint of appearance especially when the film has been employed as a decorative sheet or top ply in the manufacture of structural products wherein a dull finish or matte surface incapable of glare or a high degree of light reflection is more desirable.

It has been found also that a resinous film having a dulled surface is better adapted for drawing or inking thereby to enable use of the film as a printing base or as a drafting sheet in the preparation of drawings having greater dimensional stability and the like.

As used herein, the term "film of synthetic resinous or plastic material" is intended to refer to extremely thin films which are practically incapable of a high degree of self-sufficiency in that the film would be deformed materially in response to application of force such as ordinarily exists in the blasting process. More specifically, reference is made to films on the order of $1/10$ to 5 mils in thickness formed of resinous materials such as the polyesters (nylon), polyvinyl chloride (Geon), chlorinated rubber (Pliofilm), polyvinylidene chloride (Saran), nitrocellulose, regenerated cellulose and polyethylene terphthalate (Mylar), and the like, or laminates formed thereof with paper or other woven or non-woven fibrous fabrics; or films formed of such resinous materials having fibers incorporated therein as a reinforcement in the form of separated fibers or woven or non-woven fabrics formed thereof, such for example as in the use of glass fibers for purposes of imparting strength and dimensional stability to the thin film of plastic material. Included also are the thin webs which are formed of unsaturated polyester resins reinforced with glass or other fibers and woven or non-woven fabrics formed thereof. It has been found that the concepts of this invention may also be practiced to produce the desired dull or matte finish on extremely thin films of metal such as copper, aluminum or stainless steel webs and such materials are intended to be included also under the term.

To the present, use has been made of centrifugal blasting wheels of the type employed for use in the practice of this invention for purposes of cleaning metal castings or in the treatment of metal surfaces and the like. For such purposes, use has been made of abrasive materials such as sand or metal particles in the form of steel grit or steel shot. Such centrifugal blasting wheels have also been used for the purpose of removing burrs and flashings and the like from molded plastics and other relatively rigid and strong structures wherein materials less abrasive than sand and grit or steel shot are employed, such for example as ground nut shells or the like.

Thin plastic films of the type which are processed in accordance with the practice of this invention cannot be processed by systems employed without tearing the film apart or else providing such non-uniformity in treatment as to render the thin film unfit for the purpose for which it was intended. Such deterioration of the plastic film or non-uniformity in the matte surface that is formed is attributable not only to the character of the abrasive that is used but also to combinations of various conditions including the reaction of the large amount of abrasive thrown at high velocity against the surface of the plastic film and the inability of the film to stand up under the force conditions existing during operation.

It has been found that extremely thin plastic films of the type described can be processed by centrifugal blasting to produce a dulled or matte finish uniformly over the surface by maintaining carefully controlled conditions in operation and without destroying the film or causing noticeable deterioration of any of the desirable properties thereof. It is important for one thing to make use of an abrasive material having relatively little weight from the standpoint of the total weight of the particles thrown by centrifugal force onto the surfaces of the plastic film. By this is meant that use can be made of sand, silica, ground glass and the like abrasive materials but that the materials should be reduced to a fine particle size so as not to impart a force upon engagement with the film which will cause the film to become torn or excessively eroded in operation. While any abrasive material of sufficiently fine dimension or low mass weight can be used, it is preferred to make use of a material such as aluminum oxide, Carborundum, silica powders or glass powders and the like which are reduced to a dimension smaller than 80 mesh and preferably within a mesh size ranging from 80–140 mesh.

In addition to the proper selection of abrasive materials, it is important to pass the plastic film through the path of the abrasive while the film is held firmly against a rigid supporting surface sufficient to prevent deformation of the film while the abrasive particles are being thrown centrifugally onto the outer wall thereof. For this purpose, the film is backed up against its entire width by an element which is incapable of being deformed under the conditions existing and which operates to offset the film outwardly in a direction towards the blast during travel through the blasting area to insure the existence of a firm contacting relationship between the film and its back-up member during the blasting operation. Such conditions are achieved, in accordance with the practice of this invention, by providing a back-up member which carries the film through an arcuate or curvilinear path and out of its normal path of travel in the direction towards the blasting wheel during passage of the film through the blasting section.

In order to prevent marring the surface of the film engaged by the back-up member, it is desirable also to make use of a back-up member which travels with the film during the period of time that it is in contact therewith so as to avoid relative movement therebetween. Various means may be provided to accomplish these results, as will hereinafter be described.

A further condition important to the development of the desired results resides in the arrangement of elements to achieve substantially uniform coverage of the surface by the abrasive particles thrown onto the surface to form the matte finish but in a manner which avoids interferences between the abrasive material which is thrown onto the surface of the film and that which has already done its work. Unless the abrasive is removed, the abrasive remaining on the surface of the film tends to interfere with the operation of the abrasive which is being thrown onto the surface sufficiently to render the latter substantially ineffective. Removal of the abrasive should be effected without crossing the path of the abrasive particles being thrown onto the film. Otherwise the abrasive being removed will operate as a cushion to minimize the effect of the abrasive being thrown. This not only leads to waste in effort and in abrasive but the product that is produced is of lesser commercial value because of non-uniformities in the dull or matte finish that is formed.

To provide conditions suitable for the treatment of thin films of plastic materials with such small or light weight particles of abrasive, the elements are arranged so that the abrasive falls away immediately from the surface of the film and the blasting wheels are arranged so as to avoid throwing the abrasive onto areas of the plastic film where the abrasives previously applied would tend to cross the path thereof. These conditions have been secured by an up-blast of the abrasive from a point beneath the film against the underside of the film while it passes over a downwardly curved, horizontally disposed path, as illustrated in FIGURES 1, 5 and 6 of the drawings. It can also be accomplished by blasting the outer surface of the film while traveling lengthwise over the arcuate path with the film extending crosswise in a vertical direction. In the event that more than one blasting wheel is employed for achieving full and uniform coverage of the surfaces of the film, it is desirable to stagger the wheels lengthwise in the direction of travel with the first wheel adjacent one of the lateral edges of the film and aligned to throw the abrasive against the opposite portion of the film with the next longitudinally thereof located adjacent the opposite edge of the film and aligned to throw the abrasive particles onto the portion of the film closest to the first film to provide paths which cross each other in the crosswise direction but which are spaced from each other longitudinally so that interferences are substantially completely avoided and abrasive particles are unable to creep underneath the film and mar the other surface thereof. In addition to the use of an abrasive with which a momentum sufficient to tear the film is not likely to be developed, it is desirable also to coordinate the blasting wheels with the film to throw the abrasive at a low angle onto the film, generally referred to as low angle blasting. For this purpose, the wheels are best arranged to throw the abrasive against the surface of the film at an angle less than 60° and preferably at an angle within 15–60° with the film.

Having defined some of the conditions important to the development of a process and equipment for the treatment of extremely thin films of plastic material to produce a dull or matte finish on the surfaces thereof, it is an object of this invention to produce an apparatus which enables the development of same and it is a related object to provide a method for the treatment of extremely thin films of plastic material to produce a dull or matte finish on the surfaces thereof without destroying the film or causing deterioration in the properties thereof.

Another object is to provide a method and apparatus for use in the same wherein continuous webs of extremely thin plastic material can be treated in a continuous operation to produce a dull or matte finish on the surfaces thereof and it is a related object to provide a method and apparatus for use in same which can be employed in a simple and efficient manner to produce a uniformly dull or matte finish over the entire surface of the film of plastic or synthetic resinous materials.

These and other objects and advantages of this invention will hereinafter appear and for purposes of illustration, but not of limitation, embodiments of the invention are shown in the accompanying drawings in which—

FIGURE 1 is a perspective elevational view of an apparatus in schematic arrangement which may be employed in the practice of this invention;

FIGURE 2 is a top plan view of a modification which may be used for a portion of the apparatus shown in FIGURE 1;

FIGURE 3 is a side elevational view of the portion of the apparatus shown in FIGURE 2;

FIGURE 4 is an end elevational view of the portion of the apparatus shown in FIGURE 2;

FIGURE 5 is a side elevational view of a further modification which may be employed for a portion of the apparatus shown in FIGURE 1;

FIGURE 6 is an end elevational view of the modification shown in FIGURE 5;

FIGURE 7 is a plan view of a still further modification which may be employed for a portion of the apparatus shown in FIGURE 1;

FIGURE 8 is a side elevational view of the modification shown in FIGURE 7, and

FIGURE 9 is an end elevational view of the modification shown in FIGURE 7.

In the modification illustrated in FIGURE 1 of the drawings, the numeral 10 represents an enclosure formed of a top wall 12, side walls 14 and end walls 16 and 18. The interior of the enclosure is divided between a blasting chamber 20 and a cleaning chamber 22 by a partitioning wall 24.

Conventional feeding, aligning and tensioning means of the type used in the textile industry are provided in combination with the enclosure for advancing an endless web 26 of a thin film of synthetic resinous or plastic material from a feed roll 28 about an idler roll 30 which turns the film 26 for advancement horizontally through an aligned horizontal slot 32 in the end wall 16 of the enclosure for passage of the film into the blasting chamber 20. A similar slot 34 is provided in the partitioning wall 24 in substantial alignment with the slot 32 and through which the web or film of plastic material passes from the blasting chamber 20 into the cleaning chamber 22. The slots are dimensioned to have a width exceeding the width of the film and a height sufficient to permit the film cleanly to pass therethrough but sufficient to militate against the passage of an excessive amount of abrasive particles from the blasting chamber.

Within the blasting chamber 20, means are provided for backing up the thin film of plastic material 26 and to displace the film curvilinearly outwardly from its path of travel during passage through the blast zone to bring the film firmly into contacting relation with the back-up means while the film is being subjected to the forces of the abrasive particles thrown centrifugally against the outer surfaces thereof. For this purpose, there is provided, in the modification shown in FIGURE 1, an endless member in the form of a belt 36 which is threaded about a pair of longitudinally spaced horizontally disposed rollers 38 and 40. One of the rollers is adapted to be connected to a driving motor or other equivalent means (not shown) for causing the belt to travel at a linear speed synchronized with the speed of travel of the belt 36 through the blasting chamber thereby to minimize relative movements between the back-up belt and the film. It is desirable to avoid such relative movements while in contacting relation one with the other, otherwise the surface of the film engaged by the belt will be subject to abrasion which may cause scratches or other blemishes undesirably to be formed on the inner wall of the film.

Means are provided to cause the film to be displaced downwardly from its normal path of travel between the slotted openings 32 and 34 in the blasting chamber. For this purpose, there is provided a rigid shoe 42 which is disposed between the horizontal runs of the belt and which is formed with an arcuate section 44 in its bottom wall which extends downwardly below the level of the idler rollers 38 and 40 and the slots 32 and 34 to cause the belt 36 and the film 26, in surface contact therewith, to be carried downwardly curvilinearly through an arcuate path. Thus the film is caused firmly to engage the back-up belt as it is drawn under tension through the blasting zone in the blasting chamber. Conventional winding means or other means not shown may be employed for drawing the web at a uniform rate from the feed roll 28 for travel through the blasting zone under sufficient tension to cause the film resiliently to engage the back-up belt during displacement for travel about the downwardly extending arcuate path.

Depending upon the width of the film, one or more centrifugal blasting wheels 46 are located within the blasting chamber below the belt 36. When more than one blasting wheel is employed, such as the two shown in FIGURE 1 of the drawings, each of the wheels may be separately driven as by a motor 48 preferably located outside of the enclosure and operatively connected to the wheel through a driving belt 50. It is preferred to stagger the wheels in a longitudinally spaced apart relation and in a laterally spaced apart relation to cause the underside of the film to be uniformly impacted by the abrasive particles centrifugally thrown by the wheels, preferably at an acute angle, against the underside of the film while the film is being backed up by the outwardly displaced portion of the lower run of the belt 36 and in spacing the wheels crosswise of the film, it is preferred to arrange the wheels for throwing the abrasive inwardly onto the film along paths which cross each other as illustrated in FIGURES 4, 6 and 9 of the drawings.

When use is made of a throwing wheel described in Patents No. 2,162,139 and No. 2,352,588, it is preferred to arrange the wheels for throwing the abrasive inwardly from opposite directions and upwardly against the lower surface of the film at an angle within the range of about 15–60°. When the abrasive is thrown upwardly against the underside of the film, unless cross-over patterns are used for the blast, the longitudinal space between the wheels is of lesser importance because the abrasive is able to fall downwardly away from the film without passing through the paths of the abrasive thrown from the other wheel or wheels.

Instead of making use of centrifugal blasting wheels of the type described, other means for throwing abrasives against the underside of the film may be employed, such for example as in the use of compressed air in sand blasting, or use can be made of vapor blasting devices, or other devices wherein use is made of air, vapor, water, steam or the like fluid or gaseous medium as a carrier for the abrasive particles.

The bottom wall of the blasting chamber is provided with numerous openings, as in the form of a grating 52 through which the abrasive particles drain downwardly from the blasting chamber 20 into a collective chamber 54 provided with a boot 56 at the lower portion thereof and into which the abrasive material is displaced for return to the feed section above the housing as by means of a bucket elevator 58 or other suitable conveying means.

The cleaning chamber is provided with means for removing dusts and abrasive particles which tend to settle on the top surface of the film during passage through the blasting chamber and through the leading end of the cleaning chamber. While suction means may be employed for picking off the separable particles from the surface of the film, it is preferred to effect removal by the use of an air knife which blows the particles from the surface of the film prior to passage of the film outwardly from the enclosure. As illustrated in the drawings, use is made of an air knife in the form of elongate nozzles 70 and 72 connected by a duct 74 to a motor operated centrifugal blower 76 located outside of the enclosure. In the preferred practice, the nozzles 70 and 72 are arranged to extend angularly outwardly in the direction away from each other from the center of the film so as to direct the air blade angularly downwardly onto the film to blow the particles laterally outwardly from the surface of the film whereby the particles are displaced laterally beyond the film where they can settle downwardly for passage through the grating 78 in the floor into the collection chamber 54 therebeneath.

The end wall 18 of the cleaning chamber 22 is formed with a slotted opening 60 similar to the other slots for passage of the film 26 from the cleaning chamber to additional washing or cleaning means by which the surfaces of the film are cleansed of foreign materials and then the film is advanced to the wind-up roll 62 which is power operated as by a motor to draw the film through the machine. To prevent contact between the film and the walls of the enclosure during passage of the film through the slots, idler rollers are employed to support the film at the desired level, such for example as the roller 30 in advance of the enclosure, roller 64 which cooperates with the idler rollers 38 and 40 in the cleaning chamber to maintain the level of the film above the arcuate lower run of the belt, roller 66 in the cleaning chamber and roller 68 just outside of the cleaning chamber. It will be understood that the rollers may be differently placed and that additional rollers may be employed, such as to provide a pair of rollers in each chamber adjacent the inlet and outlet openings thereof to support the film at a level for passage cleanly through the opening and to support the film at the desired level in the blasting chamber for insuring intimate contact with the arcuate portion of the back-up belt and to support the film at the desired level in the cleaning chamber for most efficient reaction with the air knife.

While the air knife is effective to remove a large proportion of abrasive particles and dust which might collect on the upper surfaces of the web during passage through the blasting chamber and portions of the cleaning chamber, some fine particles and dust often tend to cling to the surfaces of the film, either by physical attraction or ionic attraction, so that it is advisable to subject the blasted film to a more thorough cleaning operation such as a water wash prior to winding the film onto the windup roller 62. The water wash forms no part of this invention.

The elevator 58 raises the abrasive particles from the boot 56 to the bin 80 at the top of the elevator. The abrasive particles are displaced laterally by a screw conveyor 82 from the bin 80 to a separator section 84 where large particles, tramp iron and other foreign material are removed by means which are conventional in the blasting art. The foreign material is displaced from the system by a conveyor 86 which delivers the material to a duct 88 for collection in a suitable receptacle. From the separator 84, the abrasive particles are cascaded downwardly into a feed hopper 90 from which the material is fed at a desired rate from the hopper through tubes 92 and 94 for delivery to the blasting wheels 46.

The dusts and other fine particles may be separated from the abrasive material recycled to the feed hopper 90 by passing a slow current of air across the path of the abrasive materials as they are cascaded downwardly from the separator to the feed hopper. The dust-laden air is led by a duct 96 to a cyclone separator 98 for removing the solid particles from the air.

The air blown onto the top side of the film 26 in the cleaning chamber passes downwardly with the particles removed through the grating and into the collection chamber 54. From there the dust-laden air passes upwardly through the elevator and is led from the elevator into the cyclone separator 98 with the dust-laden air from the separator for removal of the solid particles. The air from the cyclone can be joined with the air from the blower 76 for use as the air knife.

In operation, a rewinding means of conventional construction for use in the textile trade and located beyond the outlet end of the enclosure, as represented by the numeral 62, draws the web of plastic material from the unwinding roll 28 about the idler roller 30 which turns the thin film horizontally for passage through the opening 32 into the blasting chamber. The web 26, which travels over the idler roller 64, meets the conveyor belt 36 traveling in the same direction and at the same speed. The web is carried downwardly with the back-up belt during passage over the shoe 42 to cause the web to be braced by the belt during passage through the blasting zone. As the web travels through the blasting zone, abrasive particles are thrown by the blasting wheels 46 upwardly at an acute angle against the underside of the film for abrading the surfaces of the film sufficiently to form a dull or matte finish.

After impacting the surfaces of the film, the abrasive particles fall downwardly through the blasting chamber through the grating in the floor to the collection chamber 54. The film continues to travel continuously with the lower run of the belt and then it leaves the belt for travel alone lengthwise through the opening 34 into the cleaning chamber 22. The level of the web is controlled in the cleaning chamber by the idler rollers 66 and 68 over which the web travels for passage under the air knife which removes particles of abrasive material collected on the upper surfaces thereof. The film 26 continues to travel continuously beyond the air knife through the opening 60 and over the idler roller 68 for subsequent treatment by the additional cleaning and drying means, if desired, after which it is wound up on the winding drum 62. The unwinding roller 28 is provided with a braking means to develop sufficient tension in the web to maintain the web in contacting relation with the downwardly extending arcuate portion of the back-up belt during passage through the blasting zone.

In the modification illustrated in FIGURES 5 and 6 of the drawings, the back-up belt 36 and the idler rollers 38 and 40 over which it travels is replaced in the blasting housing by a large drum 100 mounted for rotational movement about a horizontal axis 102. The drum is dimensioned to have a width at least as great as that of the web 26 being treated. Horizontally disposed idler rollers 104 and 106 are provided in advance of and immediately beyond the drum at a level slightly above the bottom of the drum so that the web 26 threaded to pass over the idler rollers 104 and 106 and about the underside of the drum 100 will be carried downwardly with the curvilinear end portion of the drum beneath the idler rollers thereby to cause the web to be held in intimate contact with the lower portion of the drum beneath the rollers. As in the modification illustrated in FIGURE 1, the blasting means in the form of wheels 46 are located adjacent the underside of the drum between the idler rollers to throw abrasive particles upwardly against the underside of the film while the latter is backed up by the peripheral arcuate portion of the drum. As such, the drum operates in a manner similar to the back-up belt rigidly to support the film during that period of time in which it is subject to impact by the abrasive particles. The drum is connected to suitable power means for rotation to provide a peripheral speed equivalent to the linear speed of the film 26 for travel together without noticeable relative movement.

In the modification illustrated in FIGURES 2, 3 and 4, the film is arranged to pass through the enclosure while in a vertical position as distinguished from the horizontal position in which it is advanced through the blasting and cleaning chambers in the modifications previously described. For this purpose, the feed and winding rollers and all of the idler rollers in and about the enclosure may be arranged to turn about a vertical axis and the elongate slots 32, 34 and 60 in the walls of the enclosure are also arranged to extend in a vertical direction for passage of the film therethrough into the one chamber and then the other. Instead of arranging all of the elements in control of the film for turning about vertical axes, it is preferred to maintain the pay-off, wind-up and tensioning rollers for turning movement about horizontal axes and to make use of turning rollers for turning the film through an angle of 90° for travel in a vertical position through the blast chamber. When operated in this position the cleaning chamber can be dispensed with since particles will fall from the surfaces other than those held physically or by ionic attraction.

In the described modification, use is made of an endless belt 110 operating about rollers 112 and 114 and a shoe 116 similar in construction to that described in FIGURE 1 of the drawings but instead of positioning the members for travel about a horizontal plane, the members are vertically disposed in the housing so that the belt travels about the rollers turning on a vertical axis. The curvilinear wall 118 of the shoe 116 extends laterally into the path of the belt in the direction towards the blasting wheels 46 to cause outward displacement of the web during passage in contact with the belt between idler rollers 120 and 122 which are located at a level spaced inwardly from the outermost portion of the arcuate shoe.

In this modification, the wheels 46 are mounted to throw the abrasive particles at a low angle laterally against the outer wall of the film while the film is being backed up by the belt. When the wheels are disposed below and above the web for throwing the abrasive particles against the web, it is preferred to stagger the wheels in the longitudinal direction and to position the first wheel 46ª below the next wheel 46ᵇ so that the abrasive thrown by the first wheel onto the film will ricochet without passing through the path of abrasive particles thrown by the next wheel thereby to minimize interferences with the particles thrown at the surfaces of the film and also to avoid undesirable cushioning effects. When arranged to make use of the preferred cross-over patterns, the abrasive thrown by the lower wheel against the upper portion of the film will rebound upwardly and out of the path of the abrasive thrown by the wheel and others adjacent thereto while the abrasive thrown by the upper wheel against the lower portion of the film will continue to travel downwardly to the grating floor. Cross-over patterns of the type described are preferred not only because of the greater efficiencies and more uniform results secured, but the particles thrown against the opposite portions of the film are unable to force their way beneath the edges and under the film.

The other elements associated with the film for treatment or for guiding the film are similarly located for operation in a vertical plane except that particles are unable to collect on any surface of the vertically disposed film thereby to eliminate the necessity for making use of a cleaning chamber or else to make use of more simplified means, such as a shaker mechanism for loosening particles which might otherwise be held on the vertically disposed film.

In the modification illustrated in FIGURES 7, 8 and 9 of the drawings, the back-up belt employed in FIGURES 2, 3 and 4 is replaced by a drum 130 which turns within the blasting chamber about a vertical axis. The idler rollers 132 and 134 in advance of and rearwardly of the drum are also mounted for rotational movement about a vertical axis but in which the rollers are positioned so that an end portion of the drum extends outwardly laterally beyond the idler rollers to provide the arcuate portion which serves to back up the film during passage through the blasting zone. The vertically disposed web 26 which travels through vertically disposed slots in the end walls of the enclosure into the blasting chamber is threaded about the idler rollers 132 and 134 and about the peripheral portion of the drum therebetween to cause the web to be held firmly against the periphery of the drum while being blasted by the abrasive materials thrown from the blasting wheels. As in the previously described modification, the first wheel 46<sup>a</sup> is positioned to throw the abrasive laterally at a small angle against the lower portion of the web while the next wheel 46<sup>b</sup> which is spaced rearwardly of the first is positioned to throw the abrasive at a low angle at an upper portion of the web.

When a pair of blasting wheels of the type described are employed for throwing the abrasive particles in crossover patterns onto the surfaces of the thin plastic film, it is preferred to locate the blasting wheels adjacent the lateral edges of the film to direct the abrasive inwardly from opposite directions at a lower angle onto the film. In practice, using a wheel of about 19½ inches in diameter rotating at a speed of about 2250 r.p.m., the wheels are located on a line about 7 inches beyond the opposite edges of the film. The abrasive is thrown from the wheel at a linear speed of about 14,000 feet per minute. The wheels can be operated at lower speeds, such as at 1800 r.p.m. or at speeds as high as 3600 r.p.m., depending upon the type of abrasive that is employed and the material being treated as well as the spaced apart relation of the wheels below or beyond the film.

In practice, when use is made of a shoe of the type illustrated by the numeral 42, the upper run of the belt 36 may be additionally supported by a rigid supporting plate 42<sup>a</sup> so as to minimize deterioration of the belt. It is preferred to make use of a back-up member having a resilient surface which comes in contact with the film, such for example as a covering of leather, rubber or other elastomeric material. This is to prevent damage in the event that any abrasive particles should become entrapped between the back side of the film and the back-up member. The shoe and the drum operate to give support to these coverings in a manner to provide a rigid support for the film during passage through the blasting area thereby to prevent deformation of the film in response to impact so that a uniformly dulled or matte finish will be secured at the film surface.

It will be understood that changes may be made in the details of construction, arrangement and operation without departing from the spirit of the invention, especially as defined in the following claims.

We claim:

1. Apparatus for treating the surface of a thin film of plastic material to produce a dull finish on the surface thereof comprising an enclosure having an inlet and an outlet, means for advancing the web continuously under slight lengthwise tension from the inlet to the outlet through the enclosure, a drum mounted for rotational movement about a horizontal axis in the enclosure at a rate to provide a peripheral speed corresponding to the linear speed of the web through the enclosure and having a curvilinear portion extending downwardly into the path of the web whereby a firm contacting relationship is maintained between the peripheral surface of the drum and one side of the web during travel of the web with the drum about the portion of the drum in the path thereof, and means for throwing fine abrasive particles at a low angle onto the outer surface of the web while being backed up by the drum.

2. Apparatus as claimed in claim 1 in which the means for throwing fine abrasive particles upwardly onto the web comprises a centrifugal blasting wheel which throws abrasive particles centrifugally at high velocity upwardly against the underside of the web and in which the wheel is located beyond the lateral edge of the web and arranged for throwing the abrasive inwardly and upwardly at a low angle with respect thereto.

3. Apparatus as claimed in claim 1 in which more than one centrifugal blasting wheel is employed and in which the wheels are spaced lengthwise one from the other and with adjacent wheels being arranged adjacent opposite edges of the film to throw abrasive particles inwardly along paths which cross but which are longitudinally spaced one from the other.

4. Apparatus for treating the surface of a thin film of plastic material in the form of a continuous web to produce roughness in the surface thereof comprising an enclosure having an inlet and an outlet through which the web passes for travel through the enclosure, means for advancing the web vertically continuously under slight lengthwise tension through the enclosure, a supporting member in the form of an endless belt mounted for continuous linear movement about vertically disposed rollers and at a rate corresponding to the linear speed of the web through the enclosure, a rigid member having an outwardly extending curvilinear portion in engagement with a lateral run of the belt to cause the belt to travel in a corresponding curvilinear path which extends outwardly into the path of the web advanced under slight tension through the enclosure whereby the web comes into a firm contacting relation with the belt during travel with the belt about the arcuate portion, and means for throwing fine abrasive particles laterally at a low angle onto the outer face of the vertically disposed web while being backed up by the belt.

5. Apparatus as claimed in claim 4 in which the means for throwing fine abrasive particles onto the web comprises a centrifugal blasting wheel which throws abrasive particles centrifugally at high velocity against the outer side of the web and in which the wheel is located beyond the lateral edge of the web and arranged for throwing the abrasive particles at a low angle in the direction towards the web.

6. Apparatus as claimed in claim 5 in which more than one blasting wheel is employed and in which the wheels are spaced lengthwise one from the other with adjacent wheels arranged adjacent the opposite upper and lower edges of the film with the lower wheel arranged to throw abrasive particles against the upper portion of the film and with the upper wheel arranged to throw abrasive particles against the lower portion of the film in which the wheels are spaced longitudinally alongside the film to throw abrasive particles in paths which cross each other but are spaced longitudinally of each other.

7. Apparatus for treating the surface of a thin film of plastic material in the form of a continuous web to produce a matte finish thereon comprising an enclosure, means for advancing the web vertically continuously under slight lengthwise tension through the enclosure, a drum mounted for rotational movement about a vertical axis in the enclosure and at a rate to provide a peripheral speed corresponding to the linear speed of the web through the enclosure and positioned to locate a peripheral portion of the drum into the path of the web whereby a firm contacting relationship is established between the drum and one side of the web during travel of the web with the arcuate portion of the drum in its path, and means for throwing fine abrasive particles at a low angle onto the outer surface of the web while being backed up by the drum.

8. Apparatus as claimed in claim 7 in which the means for throwing fine abrasive particles onto the web comprises a centrifugal blasting wheel which throws abrasive particles centrifugally at high velocity against the outer side of the web and in which the wheel is located beyond the lateral edge of the web and arranged for throwing the abrasive particles at a low angle in the direction towards the web.

9. Apparatus as claimed in claim 7 in which more than one blasting wheel is employed and in which the wheels are spaced lengthwise one from the other with adjacent wheels arranged adjacent the opposite upper and lower edges of the film with the lower wheel arranged to throw abrasive particles against the upper portion of the film and with the upper wheel arranged to throw abrasive particles against the lower portion of the film in which the wheels are spaced longitudinally alongside the film to throw abrasive particles in paths which cross each other but are spaced longitudinally of each other.

References Cited in the file of this patent

UNITED STATES PATENTS

| | | |
|---|---|---|
| 2,204,588 | Guite | June 18, 1940 |
| 2,332,251 | Parrish | Oct. 19, 1943 |
| 2,337,048 | Huyett et al. | Dec. 21, 1943 |
| 2,448,316 | Lesavoy | Aug. 31, 1948 |
| 2,666,282 | Peterson | Jan. 19, 1954 |